United States Patent
Chen et al.

(10) Patent No.: US 7,854,001 B1
(45) Date of Patent: Dec. 14, 2010

(54) AGGREGATION-BASED PHISHING SITE DETECTION

(75) Inventors: Chih-Sheng Chen, Taipei (TW); Yao-Tang Chang, Taipei (TW); Shr-An Su, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 775 days.

(21) Appl. No.: 11/771,712

(22) Filed: Jun. 29, 2007

(51) Int. Cl.
*G06F 11/00* (2006.01)
*G06F 15/16* (2006.01)

(52) U.S. Cl. .............................. 726/22; 726/23; 726/11

(58) Field of Classification Search ............. 726/11–14, 726/22–26; 713/150, 154; 709/225
See application file for complete search history.

(56) References Cited

U.S. PATENT DOCUMENTS

2007/0006305 A1* 1/2007 Florencio et al. ............... 726/22

2007/0204341 A1* 8/2007 Rand et al. ..................... 726/22

* cited by examiner

*Primary Examiner*—Hosuk Song
(74) *Attorney, Agent, or Firm*—IP Strategy Group, P.C.

(57) ABSTRACT

A computer-implemented method for reducing phishing attacks that employ malicious websites is provided. The computer-implemented method includes gathering information about potentially malicious websites from a plurality of sources. The computer-implemented method also includes reducing the number of potentially malicious websites gathered; thereby creating a malicious website database that tracks at least a subset of the potentially malicious websites. In addition, the computer-implemented method includes generating a malicious website blacklist from the malicious website database, each website in the malicious website blacklist satisfying inclusion criteria, wherein the malicious website blacklist is employed to decide whether an access request to a given website is permitted.

22 Claims, 4 Drawing Sheets

AGGREGATION-BASED PHISHING SITE DETECTION

BACKGROUND OF THE INVENTION

The Internet is a collection of interconnected computer networks, which has long been employed for data management, communication, purchasing goods, sharing, searching, etc. As the Internet continues to grow, users are becoming increasingly more comfortable in using the Internet of critical, sensitive applications such as banking, shopping, or confidential data. access. To ensure that such applications remain secure, some type of authentication (e.g., using userids or passwords) are often employed. However, such authentication scheme may be vulnerable to phishing attacks by phishers.

Phishing is a type of attack designed to deceive a user into unwittingly surrendering sensitive credentials, such as usernames, passwords, credit card, bank account or social security numbers. Phishers accomplish their phishing attacks by dissimulating themselves as trustworthy and authentic, most commonly through electronic communication, such as e-mail or instant messages.

An example of a conventional phishing technique is link manipulation. Phishers may employ a cleverly designed Uniform Resource Locator (URL) link appearing to belong to a valid we site and when visited actually directs the user to a malicious website where the user may be tricked into entering their personal credentials. Once the phisher has acquired these sensitive credentials, he or she can use these sensitive credentials in many ways, which may cause an immense amount of damage to the victim, such as withdrawing funds out of financial accounts. Therefore, detecting these malicious websites more efficiently and intelligently is a critical task for individuals and organizations alike.

One technique for detecting these malicious websites involves employing a signature-based content filtering solution. Signature-based content filtering solutions utilize tools to identify the URLs associated with the phishing websites. For example, spam traps may be set up to attract as many undesirable e-mails as possible. Once the undesirable e-mails are collected, analysis may be conducted to extract a pattern from the URL, which pattern would serve as a signature of the phishing website for future identification.

Signature-based content filtering is, however, a reactive solution wherein the pattern is not extracted until after the phishing attack has initiated. Unfortunately, because the life cycle of a phishing website is usually very short lived, around 52 hours for example, by the time the pattern is identified and distributed to the customers, the phishing website more than like will already be out of date.

Another solution for detecting these malicious websites employs a heuristic rule-based approach. In a heuristic rule-based approach, instead of extracting the pattern for phishing detection from the URLs, the legitimate website's content is actually analyzed to create a set of heuristic rules. These sets of heuristic rules are then employed to determine whether the suspect website is likely to be a phishing website for the particular legitimate website. However, because the number of websites on the Internet that are targeted by phishers may be quite large, a great deal of effort and time is needed in order to generate and fine-tune the heuristic rules for all the legitimate websites. Further, the legitimate websites themselves are updated from time-to-time, necessitating frequent time-consuming heuristic rules updating. The heuristic rule-based approach also tends to suffer from a large number of false positives.

In view of the foregoing, improved solutions for detecting phishing are desired.

SUMMARY OF INVENTION

The invention relates, in an embodiment, to a computer-implemented method for reducing phishing attacks that employ malicious websites. The computer-implemented method includes gathering information about potentially malicious websites from a plurality of sources. The computer-implemented method also includes reducing the number of potentially malicious websites gathered; thereby creating a malicious website database that tracks at least a subset of the potentially malicious websites. In addition, the computer-implemented method includes generating a malicious website blacklist from the malicious website database, each website in the malicious website blacklist satisfying inclusion criteria, wherein the malicious website blacklist is employed to decide whether an access request to a given website is permitted.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by was of limitation, in the figures of the accompanying drawings and in which like reference numerals refer to similar elements and in which.

DETAILED DESCRIPTION OF EMBODIMENTS

Figure 1:
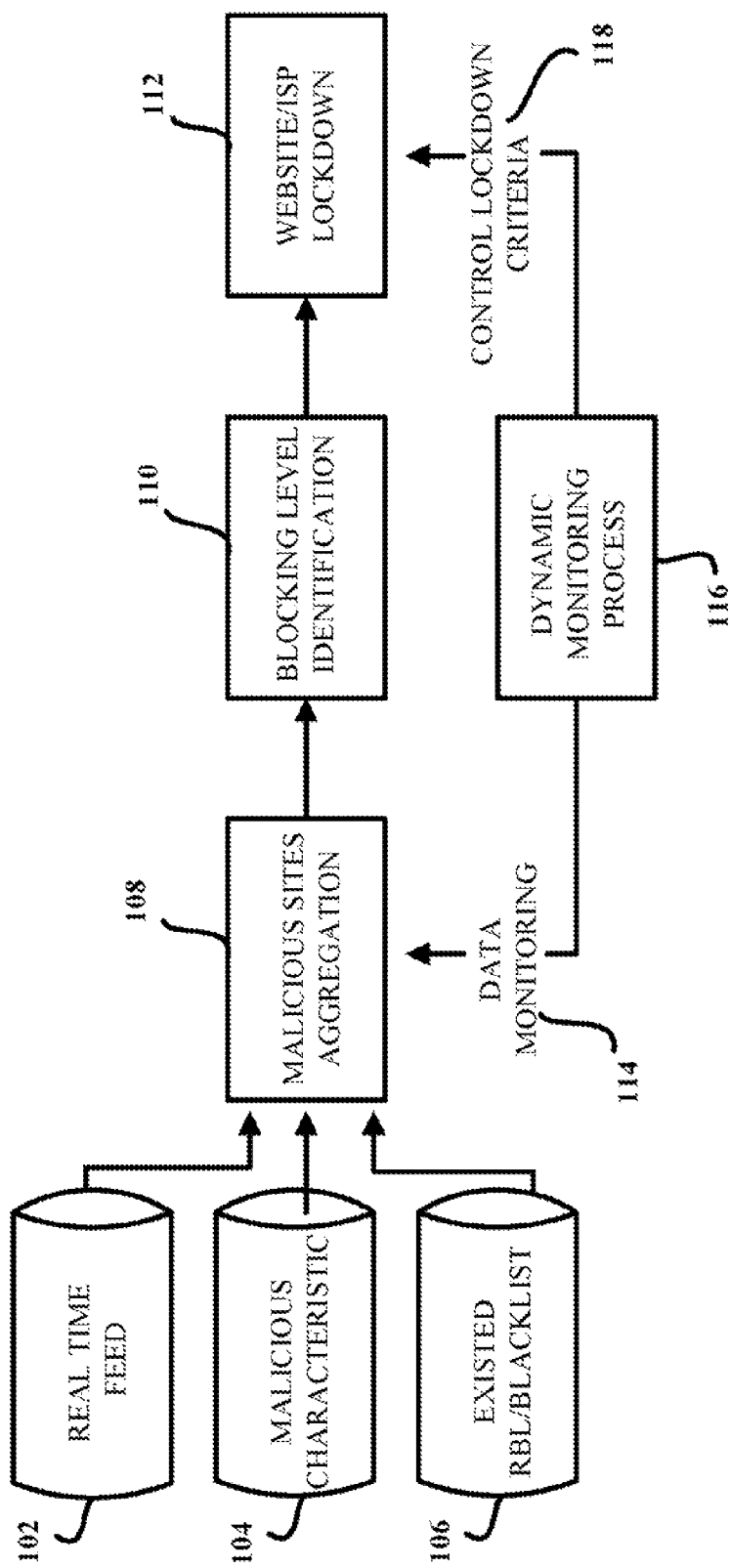
FIG. 1 shows, in accordance with an embodiment of the present invention, an arrangement for implementing an efficient malicious site detection technique.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques, It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention relate to apparatus and methods for providing efficient malicious site detection by aggregating information regarding the malicious sites. In one or more embodiments of the invention, the method employs collecting information regarding potentially malicious URLs from various sources. Real-time feeds, URL Filtering Services, Real-time Blackhole List (RBL)/Quick IP Lookup (QIL) databases (both of which are available from Trend Micro Corporation of Cupertino, Calif.), and malicious characteristics are some examples of the sources pooled for the collection of the malicious maps.

To elaborate, real-time feeds represent collections of information which are updated at about the same rate as they are received. For example, The Anti-Phishing Working Group (APWG) is a well-known association responsible for providing their subscribing members real-time phishing URLs. Another example of a real-time feed provider is PhishTank. PhishTank is a community site where anyone can submit, verify, track and share phishing data.

URL filtering services categorize URLs substantially in real-time to identify and block access to malicious and inappropriate websites. Trend Micro URL Filtering Service is an example of a URL filtering service. CAE feed is an intelligence module existed within the Trend Micro URL Filtering Service. This CAE feed may contribute thousands of real-time identified phishing sites in one given day.

RBL/QIL databases are blacklists comprising of IP addresses or URLs associated with malicious website. For example, Trend Micro has millions of URLs tracked in their RBI/QIL databases.

Malicious characteristics may be gathered from, for example, URLs or e-mails to identify malicious threats transmitted via the Internet. An example of a application that utilizes malicious characteristics to identify these malicious threats is Trend AV-JIT, available from Trend Micro Corporation of Cupertino, Calif.

In one or more embodiments of the invention, the method employs a dynamic monitoring process. A step in the dynamic monitoring process may include transforming the Fully Qualified Domain Name (FQDN) of all new incoming malicious sites into resolved IP addresses. For example, rock-phishing sites for a specific target typically resolve into one IP address.

Once the IP address list is created by transforming all FQDN into resolved IP addresses, the IP address list is purified by hit-count. A high hit-count means that the IP address is most likely employed as a malicious site. After the purification step is completed, all purified information is added to the malicious database.

During the dynamic monitoring process, the monitoring program will monitor, either periodically or asynchronously upon the occurrence of some event (such as the addition of more websites to the malicious database) the malicious database and release an IP blacklist with blocking times if specific criteria is met. The criteria is flexible and configurable. An example of a specific criteria parameter is that an IP address will remain in the malicious database if the IP address is active for at least 3 days. Further, in addition to monitoring the malicious database, the Monitoring program may continue to analyze the released IP blacklist in order to determine if the IP address should remain on the list.

In addition to blocking malicious sites by employing an IP address blacklist, a malicious network segment may also be blocked. A malicious network segment may be blocked if there is an unduly high number of malicious IP addresses corning from the same subnet.

In one or more embodiments, the aggregation-based phishing detection technique is implemented by one or more features, including for example aggregating malicious maps from various Trend Micro and/or $3^{rd}$ party sources, by monitoring the malicious site information dynamically, blocking malicious sites by utilizing IP address blacklists, and/or by blocking whole malicious network segments.

The features and advantages of the invention may be better understood with reference to the figures and discussions that follow. FIG. 1 shows, in accordance with an embodiment of the present invention, malicious sources (102, 104, and 106), malicious site aggregation 108, blocking level identification 110, website/(Internet Service Provider) ISP lockdown 112, data monitoring 114, dynamic monitoring process 116, and control lockdown criteria 118, representing an arrangement for implementing an efficient malicious site detection technique.

The first step of the embodiment of FIG. 1 may include malicious site aggregation 108. During malicious site aggregation, the method collects information pertaining to malicious sites from various sources. As mentioned earlier, some examples of these various sources may include real-time feed 102, malicious characteristics 104, and existing Real-time Blackhole List (RBL)/blacklists 106. By aggregating malicious sites from various sources, malicious site detection can be more efficient and smarter because the probability of detecting and locking down a larger number of malicious sites or ISPs will be higher than if only one source is utilized.

After malicious site aggregation 108 has been performed, the generated aggregated malicious site list may be utilized by other processes in order to lock down malicious sites or ISPs until the threats disappear. One process that operates on the aggregated malicious site list is the dynamic monitoring process 116. Dynamic monitoring process 116 is discussed more fully in FIG. 2 herein.

Briefly, a step in the dynamic monitoring process may include transforming the FQDNs from the aggregated malicious site list into resolved IP addresses. Once the resolved IP address list is created, the resolved IP address list is then purified by hit-count. A high hit-count means that the IP address is most likely employed as a malicious site. After the purification step is complete, all purified information is then added to the malicious database.

During the dynamic monitoring process, the data monitoring 114 will continuously monitor the malicious database and release an IP blacklist with blocking, times if specific control lockdown criteria 118 are met. Furthermore, the data monitoring process may, periodically or asynchronously upon the occurrence of some event, monitors the malicious database and the released IP blacklist in order to determine if the IP address should remain in the released IP blacklist or the malicious database. Removing the IP addresses from the released IP blacklist or the malicious database if no threat is currently determined allows the IP address to circulate back into the pool for utilization by new websites.

Another process that operates on the aggregated malicious site list is blocking level identification 110. During the process of blocking level identification 110, analysis is performed on the aggregated malicious site list to determine if there is a large amount of malicious IP addresses coming from the same subnet. If there is a large amount of malicious IP addresses coming from the same subnet then the whole infected malicious network segment may be blocked. The advantage of blocking a whole malicious network segment is if there is an unduly large number of malicious IP addresses coming from the same subnet, there is a high probability that the remaining IP addresses not listed will also be malicious. Therefore, blocking the whole subnet might add more protection to the users.

Figure 2:
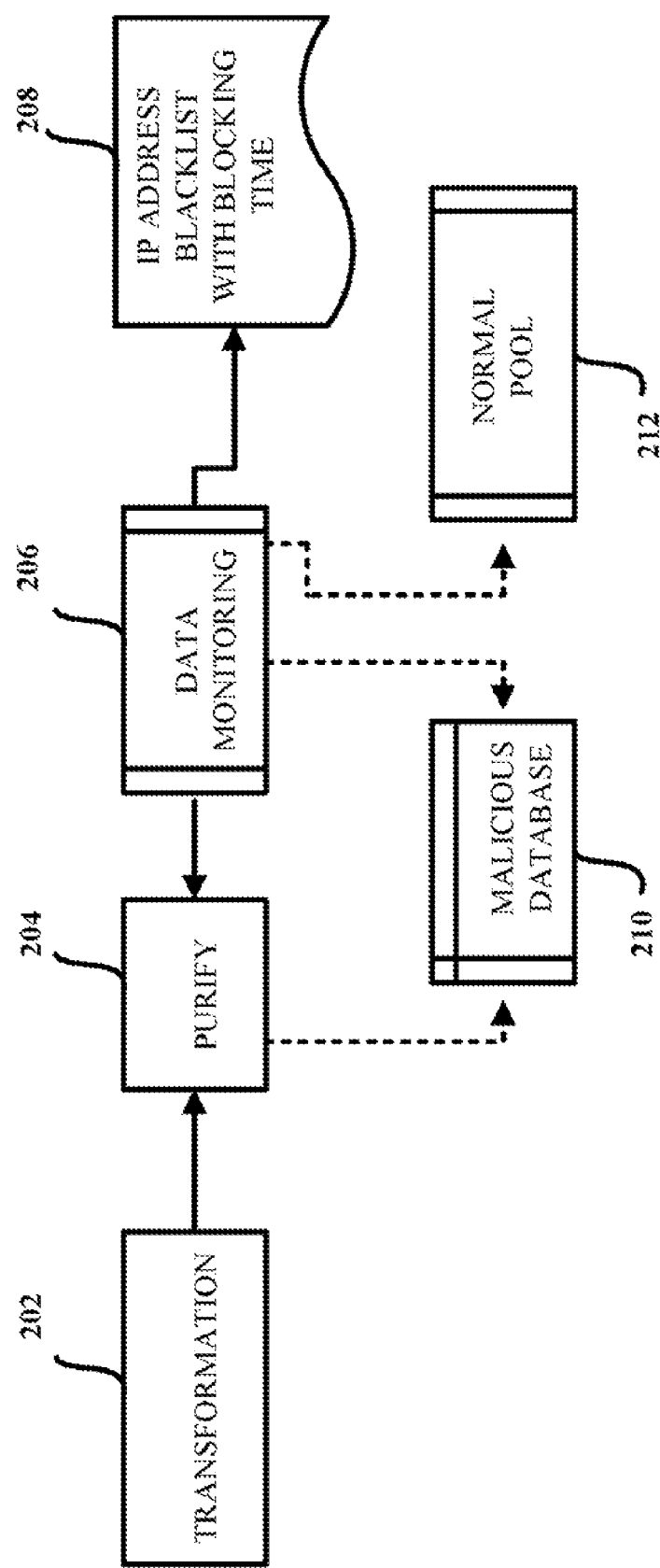
FIG. 2 shows, in accordance with an embodiment of the present invention, an example of dynamic monitoring process.

FIG. 2 shows, in accordance with an embodiment of the present invention, an example of dynamic monitoring process 116, including transformation 202, purify 204, data monitoring 206, IP address blacklist with blocking time 208, malicious database 210, and normal pool 212.

In dynamic monitoring, process 116, a transformation 202 step may include transforming the Fully Qualified Domain Name (FQDN) of all new incoming malicious sites into their resolved IP addresses. Once the IP address list is created by transforming all FQDN into resolved IP addresses, the IP address list is purified. During the purify 204 step, the resolved IP addresses are sorted by hit-count. A high hit-count means that the IP address is most likely employed as a malicious site. After the purification step is completed, all purified information is added to malicious database 210.

During the dynamic monitoring process, data monitoring 206 program will continuously monitor malicious database 210 and release an IP address blacklist with blocking time 208 if specific criteria are met. Alternatively or additionally, the parameters for the criteria may be flexible and configurable.

As mentioned earlier, during purify 204 step the resolved IP addresses are sorted by hit-count. The hit-count parameters are compared against predefined thresholds to further sort which IP addresses will be released on to the IP address blacklist with blocking time 208. For example, if the predefined hit-count threshold is set to a given value N, all IP addresses whose hit counts reach this predefined threshold will be put on the IP blacklist with blocking time 208. Another example of a specific criteria parameter is that an IP address will remain in the malicious database 210 if the IP address is active for at least 3 days.

Furthermore, in addition to monitoring the malicious database 210, the monitoring program may continue to analyze the released IP blacklist with blocking time 208 in order to determine if the IP address should remain on the list.

In addition to blocking malicious sites by employing an IP address blacklist with blocking time 208, a malicious network segment may also be blocked. A malicious network segment may be blocked if there is an unduly high number of malicious IP addresses coming from the same subnet.

In one or more embodiments of the invention, a normal pool 212 may be employed to collect IP addresses for specific predefined companies, organizations, or corporations etc. Normal pool 212 may act as a white-list. A white-list is a list of entities that are known to be non-malicious. For example, IP addresses of known companies and/or institution may be put on a white list to prevent false positives with respect to these companies and entities.

The dynamic monitoring process may utilize normal pool 212 to further monitor the IP addresses associated with the predefined companies, organizations, or corporations etc. For example, if the malicious IP address for EBay happens to be listed in malicious pool 210 and also in normal pool 212, additional investigation may be necessary before the IP address is released to the IP blacklist with blocking time 208. Further investigation may be necessary in order to determine if the infrastructure for EBay has been hacked or if a false positive has occurred.

Figure 3:
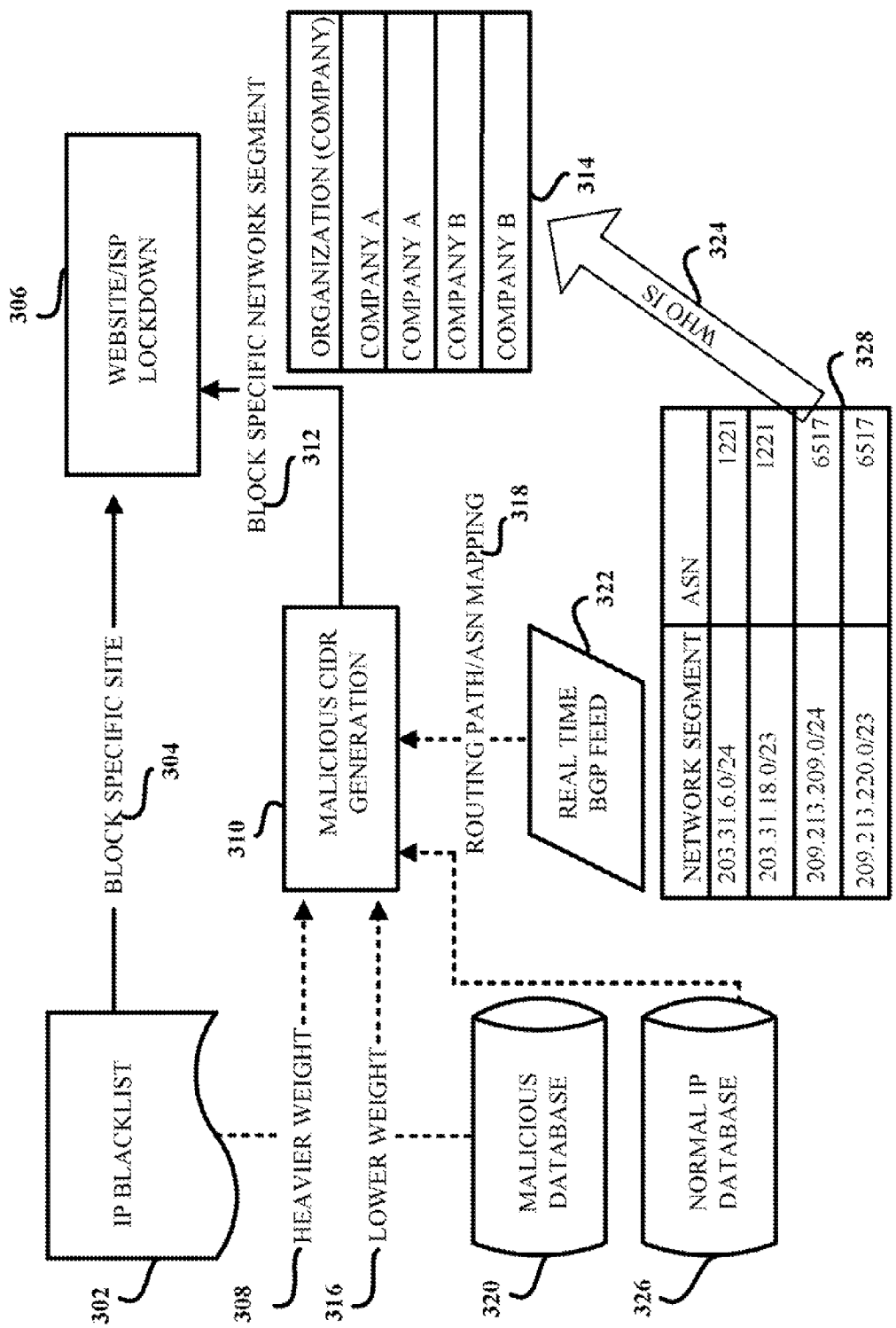
FIG. 3 shows, in accordance with an embodiment of the present invention, an example of blocking level identification.

FIG. 3 shows, in accordance with an embodiment of the present invention, an example of blocking level identification 110, including IP blacklist 302, malicious database 320, normal IP database 326, malicious Classless Inter-Domain Routing (CIDR) generation 310, real-time Border Gateway Protocol (BGP) feed 322, and website/Internet Service Provider (ISP) lockdown 306. The arrangement of FIG. 3 may be employed, in an embodiment, to block specific sites 304 or block malicious network segments.

As mentioned earlier, during malicious site aggregation 108, the method collects information pertaining to malicious sites from various sources. Malicious database 320 may be generated by utilizing this information gathered during malicious site aggregation 108. Furthermore, IP blacklist 302 may be released after continuous monitoring of malicious database 320 if specific criteria are met. IP blacklist 320 may list the most current and active malicious IP addresses. Since IP blacklist 302 may list the most current and active malicious IP addresses, specific IP addresses may be blocked without further analysis. Therefore, website/ISP lockdown 306 for the specific IP addresses may be accomplished.

In one or more embodiments of the invention, the step malicious CIDR generation 310 may employ malicious database 320, normal IP database 326 and IP blacklist 302 to possibly block entire malicious network segments. Because IP Blacklist 302 may list the most current and active malicious IP addresses, IP Blacklist 302 may carry a heavier weight than malicious database 320 in malicious CIDR generation 310 calculations and analysis.

After weight has been applied to the IP addresses, either heavy or light or some more granular gradation, the IP addresses are then looked up in BGP feed 322. BGP feed 322 is a routing protocol which works by maintaining a table of IP network segments controlled by particular routers. BGP feed 322 is consulted to determine the best blockable CIDR associated with the malicious network segments.

Once the IP addresses have been compared to BGP feed 322, analysis is then performed. This analysis may include calculations of how many IP addresses fall within a specific network segment. For example, XYZ segment may have 10 IP addresses. If 6 IP addresses are listed on the IP blacklist 302 and/or malicious database 320, based on the predefined threshold, the process may treat the network segment as malicious and release the corresponding malicious CIRD pattern. Therefore, blocking the specific network segment 312 and locking down website/ISP 306 are accomplished. The value of the predefined threshold is flexible and configurable.

In one or more embodiments of the invention, routing path/ASN mapping 318 information from BGP feed 322 may be employed to acquire network details, such as, the identification number of a particular website. Table 328 is an example of a BGP feed 322 table providing routing path/ASN mapping 318 information. The information obtained from the routing path/ASN mapping 318 may be utilized to query a WHOIS 324 system. WHOIS 324 system is a utility employed to look up ownership information about websites. Once this ownership information is obtained the companies associated with the website may be contacted for further discussion.

Figure 4:
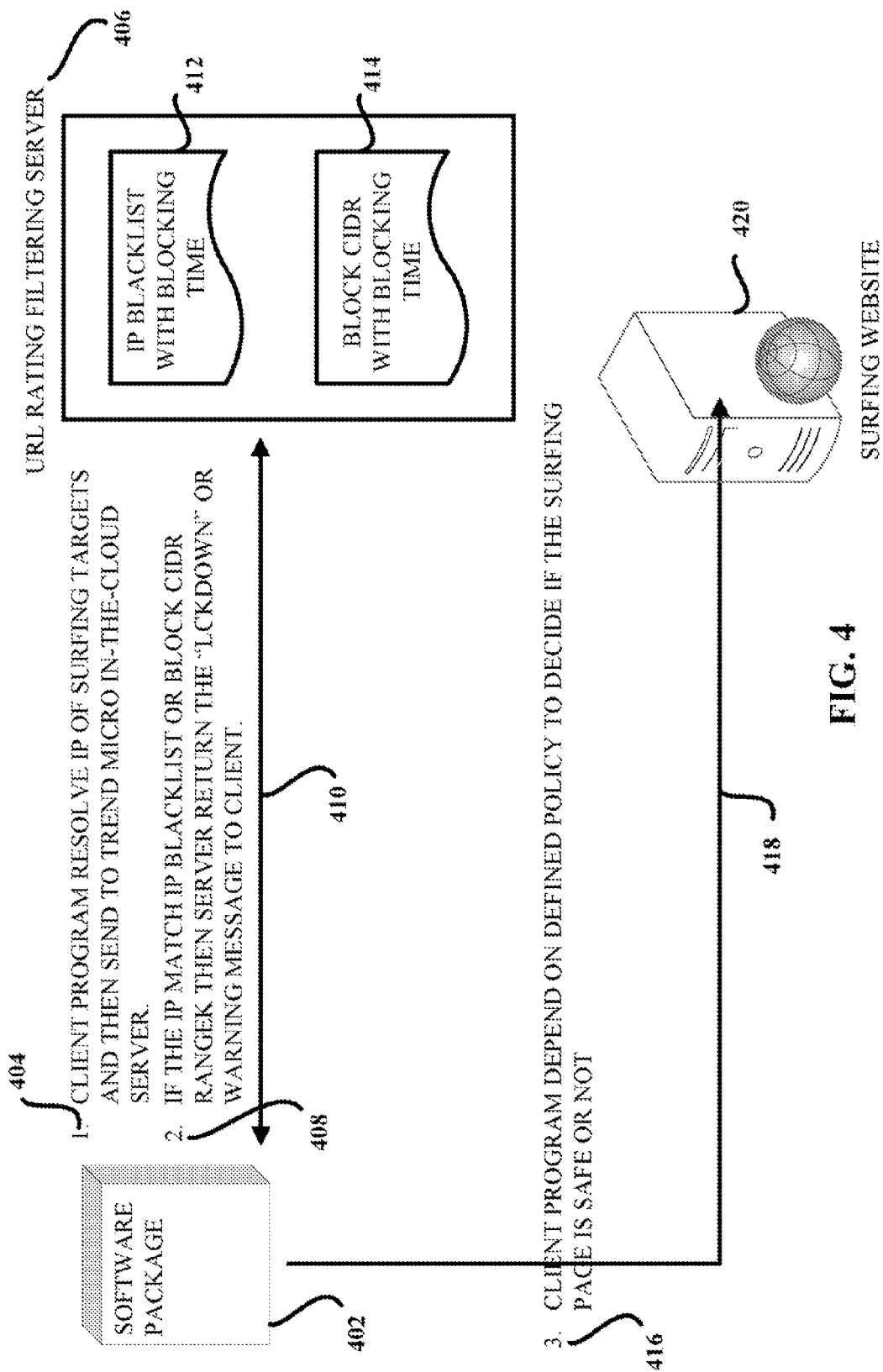
FIG. 4 shows, in accordance with an embodiment of the present invention, an example of website/Internet Service Provider (ISP) service.

FIG. 4 shows, in accordance with an embodiment of the present invention, an example of website/Internet Service Provider (ISP) service, including software package 402, IP blacklist with blocking time 414, block CIDR with blocking time 414, and surfing website 420. Applying IP blacklist with blocking time 414 and block CIDR with blocking time 414 to URL rating filtering server 406 may provide lockdown information to users when they are surfing websites 420.

For example, when a user, who is utilizing products supported with the aggregation-based phishing detection, clicks on an Uniform Resource Locator (URL) link in an e-mail message, the user's program may first resolve the website into an IP address. Once the website has been resolved into an IP address a request is then sent to URL rating filtering server 406 via the Internet 410.

As mentioned earlier, URL rating filtering server 406 employs at least two rating patterns, IP blacklist with blocking time 414 and block CIDR with blocking time 414, to detect and rate malicious websites. After the IP address has been sent to URL rating filtering server 406, the IP address is compared to both the IP blacklist with blocking time 414 and block CIDR with blocking time 414 to determine if the website is potentially malicious. If the IP address of the website matches an IP address on IP blacklist with blocking time 414 or falls within the range of a CIDR pattern then the server may return a website/ISP lockdown or warning message to the user via the internet.

As can be appreciated from the foregoing, embodiments of the invention substantially reduces the amount of human effort required to track the phishing sites. By automating the process of identifying phishing sites, phishing detection is rendered more efficient and accurate. Further, by employing an aggregation-based approach for detecting malicious sites, more attacks can be prevented because the approach is proactive instead of reactive when blocking of subnets or entire sites is implemented. The reduction in the number of attacks is due partly to the fact that alerts and blocking do not necessary have to occur after the attack has happened.

While this invention has been described in terms of several preferred embodiments, there are alterations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A computer-implemented method for reducing phishing attacks that employ malicious websites, comprising:
    gathering information about potentially malicious websites from a plurality of sources, wherein said gathering information includes: obtaining URLs (Uniform Resource Locators) for said potentially malicious websites, and transforming fully qualified domain names (FQDNs) of said potentially malicious websites into resolved IP addresses;
    reducing the number of potentially malicious websites gathered, thereby creating a malicious website database that tracks at least a subset of said potentially malicious websites;
    generating a malicious website blacklist from said malicious website database, each website in said malicious website blacklist satisfying inclusion criteria, wherein said malicious website blacklist is employed to decide whether an access request to a given website is permitted;
    analyzing said malicious website blacklist for malicious websites that are associated with the same subnet; and
    if the number of malicious websites that are associated with a given subnet exceeds a predefined threshold number, designating all websites associated with said given subnet for access blocking.

2. The method of claim 1 wherein said reducing includes purifying said potentially malicious websites by hit count.

3. The method of claim 1 further comprising monitoring said malicious website database to cull out IP addresses that have not been active for a predetermined time period.

4. The method of claim 1 further comprising monitoring said malicious website blacklist to cull out IP addresses that have not been active for a predetermined time period.

5. The method of claim 1 further comprising:
    generating a white list of websites; and
    if said given website is found in said white list, marking said given website for further investigation irrespective whether said given website is in said malicious website database or said malicious website blacklist.

6. The method of claim 1 wherein said various sources includes at least one publicly accessible pool of websites designated to be potentially malicious, said publicly accessible pool being accessible through the internet.

7. The method of claim 1 wherein said various sources includes URL filtering services that rate URLs based on the contents of the websites represented by said URLs.

8. The method of claim 1 wherein said various sources includes at least one publicly accessible URL blacklist of websites designated to be potentially malicious, said publicly accessible URL blacklist being accessible through the internet.

9. A computer-implemented method for reducing phishing attacks that employ malicious websites, comprising:
    gathering information about potentially malicious websites from a plurality of sources;
    reducing based on hit count the number of potentially malicious websites gathered, thereby creating a malicious website database that tracks at least a subset of said potentially malicious websites; and
    performing, either periodically or asynchronously, analysis on said malicious website database by:
        generating a malicious website blacklist from said malicious website database, each website in said malicious website blacklist satisfying inclusion criteria, wherein said malicious website blacklist represents one factor in deciding whether an access request to a given website is permitted, and
        culling out from said malicious website database potentially malicious websites that have not been active for a predetermined time period, thereby removing said potentially malicious websites that have not been active for a predetermined time period from being considered potentially malicious.

10. The method of claim 9 wherein said gathering information further includes:
    obtaining URLs (Uniform Resource Locators) for said potentially malicious websites; and
    transforming fully qualified domain names (FQDNs) of said potentially malicious websites into resolved IP addresses.

11. The method of claim 10 further comprising monitoring said malicious website blacklist to cull out IP addresses that have not been active for a predetermined time period.

12. The method of claim 9 further comprising:
analyzing said malicious website blacklist for malicious websites that are associated with the same subnet; and
if the number of malicious websites that are associated with a given subnet exceeds a predefined threshold number, designating all websites associated with said given subnet for access blocking.

13. The method of claim 9 further comprising:
generating a white list of websites; and
if said given website is found in said white list, marking said given website for further investigation irrespective whether said given website is in said malicious website database or said malicious website blacklist.

14. The method of claim 9 wherein said various sources includes at least one publicly accessible pool of websites designated to be potentially malicious, said publicly accessible pool being accessible through the internet.

15. The method of claim 9 wherein said various sources includes URL filtering services that rate URLs based on the contents of the websites represented by said URLs.

16. The method of claim 9 wherein said various sources includes at least one publicly accessible URL blacklist of websites designated to be potentially malicious, said publicly accessible URL blacklist being accessible through the internet.

17. A computer-implemented method for reducing phishing attacks that employ malicious websites, comprising:
gathering information about potentially malicious websites from a plurality of sources;
reducing the number of potentially malicious websites gathered, thereby creating a malicious website database that tracks at least a subset of said potentially malicious websites;
generating a malicious website blacklist from said malicious website database, each website in said malicious website blacklist satisfying inclusion criteria, wherein said malicious website blacklist represents one factor employed to decide whether an access request to a given website is permitted;
analyzing said malicious website blacklist for malicious websites that are associated with the same subnet; and
if the number of malicious websites that are associated with a given subnet exceeds a predefined threshold number, designating all websites associated with said given subnet for access blocking.

18. The method of claim 17 wherein said reducing includes purifying said potentially malicious websites by hit count.

19. The method of claim 17 wherein said gathering information further includes:
obtaining URLs (Uniform Resource Locators) for said potentially malicious websites; and
transforming fully qualified domain names (FQDNs) of said potentially malicious websites into resolved IP addresses.

20. The method of claim 19 further comprising monitoring said malicious website database to cull out IP addresses that have not been active for a predetermined time period.

21. The method of claim 19 further comprising monitoring said malicious website blacklist to cull out IP addresses that have not been active for a predetermined time period.

22. The method of claim 17 further comprising:
generating a white list of websites; and
if said given website is found in said white list, marking said given website for further investigation irrespective whether said given website is in said malicious website database or said malicious website blacklist.

* * * * *